Nov. 16, 1926.  1,606,894

G. H. PHELPS

ELECTRIC WELDING

Filed June 20, 1924

Inventor
George H. Phelps
By His Attorney
Anthony Liuma

Patented Nov. 16, 1926.

1,606,894

UNITED STATES PATENT OFFICE.

GEORGE H. PHELPS, OF WAREHOUSE POINT, CONNECTICUT, ASSIGNOR TO THOMAS E. MURRAY, OF BROOKLYN, NEW YORK.

ELECTRIC WELDING.

Application filed June 20, 1924. Serial No. 721,202.

In welding the edge or the end of one part to an extended surface of a second part, there is considerable difficulty owing to the rapid conduction of heat away from the welding area by the surrounding surface of the second part. A similar difficulty is present in most cases where a welded joint is to be provided at only a limited area on a surface of considerable extent. Examples of cases in which this difficulty arises are in the welding of fins or flanges on tubes, the welding of the edge of one plate to the extended surface of another, and the welding of a rod or of the end of a tube to a plate.

My present invention aims to avoid the difficulty above described. The accompanying drawings illustrate the application of the invention to the welding of the end of a tube to a plate.

Referring to the embodiment of the invention illustrated, a tube 1 is to be welded at its end to a plate 2.

Figure 2:
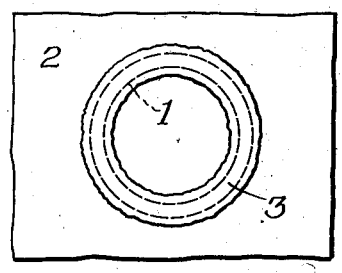
Fig. 2 is a plan of the plate before the application of the tube.

The first step is to apply to the face of the plate (Fig. 2) a deposit of metal 3 in the form of a ring roughly outlined to cover the area of the intended joint as indicated by the outline of the pipe 1 in dotted lines. This metal is deposited and may be actually welded to the plate by any usual or suitable arc welding method. It forms a projection above the surface of the plate, of limited area substantially equal to that of the joint. In this way it prevents or lessens the loss of heat by conduction in the next operation and thus facilitates the maintenance of a sufficiently high temperature to make a good weld over the joint area. The difficulties referred to above are peculiarly incident to resistance welding, where the heat is generated by the passage of an electric current through the parts. It is not of sufficient importance in arc welding operations to interfere seriously with the depositing of the metal projection 3.

Figure 3:
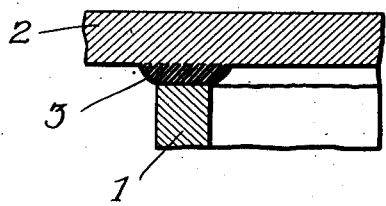
Figs. 3 and 4 are enlarged views of the joint in successive stages of the process.
Figure 4:
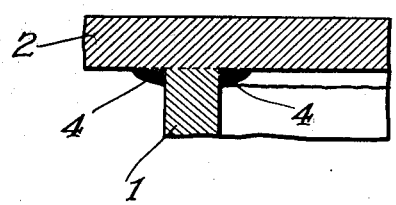

The next operation is to form an electric resistance weld between the plate and the tube. Fig. 3 shows the plate 2 with the projection 3 of deposited metal and the tube 1 bearing at its end against the latter. The parts being in this position a current is passed through them. Preferably the method is that of the Murray Reissue Patent 15,466 of October 10, 1922, in which a current of extremely high ampere strength is applied for a very brief regulated period of time, the parts being pressed together to take up the necessary quantity of metal at the joint. Whatever method of control of the current may be used I prefer to advance the tube 1 through the projection 3 of metal softened by the current until the parts 1 and 2 come into actual contact, as in Fig. 4, extruding at the same time the comparatively spongy deposited metal at the sides as indicated at 4; and the advance may be continued so as to even take up a portion of the end of the tube 1 and extrude it sidewise from the joint. While it is not essential for all purposes that the deposited metal be pushed out of the joint, yet by doing this a better joint is secured, a practically direct joint between the two parts of dense uniform metal 1 and 2.

There are known methods of welding in which a third part is placed between the two parts to be joined, the assembled parts being then pressed together while passing a current through them; and a method which uses at least two filling pieces in order to weld together two parts which are of different resistances, either by reason of their size and shape or by reason of their character as copper or brass and iron or steel.

The present invention may be applied to such methods with the added advantage that the inserts or filling pieces between the parts to be joined are welded or firmly united to the latter before the principal welding operation takes place. This facilitates the handling of the parts during the welding operation and also concentrates the heat at the point where it is desired, that is between the separate parts rather than between the deposited metal and the plate on which it is deposited. For example, assuming the plate 2 to be of copper and the tube 1 of steel, the deposited metal 3, besides its function of localizing the heat in the resistance welding operation, would tend to form an alloy of the two metals at the joint and thus to improve the quality of the latter. The deposited metal might either be copper or steel or an alloy or mixture of the two metals.

Figure 1:
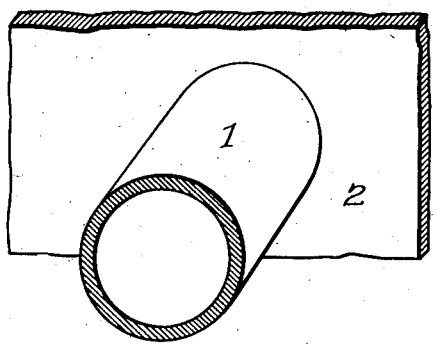
Fig. 1 is a perspective view of the finished joint.

The extruded metal may be removed to make a clean joint as in Fig. 1 or may be left in place to a greater or less extent depending on the use to which the product is to be put.

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departure from the invention as defined in the following claims.

What I claim is:

1. In making an electric resistance weld between two parts the method which consists in depositing metal on one of said parts and welding it thereto by the electric arc and applying the other part to said deposited metal and passing a current across the joint while pressing the parts together.

2. In making an electric resistance weld between two parts the method which consists in depositing metal on one of said parts and welding it thereto by the electric arc and applying the other part to said deposited metal and passing a current across the joint while pressing the parts together to an extent sufficient to extrude substantially all the arc-deposited metal and to bring said two parts into contact with each other.

3. In making an electric resistance weld between two parts of different metals respectively, the method which consists in depositing metal on one of said parts and welding it thereto by the electric arc and applying the other part to said deposited metal and passing a current across the joint while pressing the parts together.

4. In making an electric resistance weld between a plate and the end of a tube, the method which consists in depositing metal on the surface of the plate to an extent substantially equal to at least the area of the end face of the tube and welding the end of the tube throughout its entire face and through said deposited metal by the passage of an electric current across the joint while pressing the parts together.

5. In making an electric resistance weld between a plate and the end of a tube, the method which consists in depositing metal on the surface of the plate to an extent substantially equal to at least the area of the end face of the tube and welding the end of the tube throughout its entire face and through said deposited metal by the passage of an electric current across the joint while pressing the parts together to an extent sufficient to extrude at least a substantial part of said deposited metal and, finally, removing the extruded metal to make a clean joint.

In witness whereof, I have hereunto signed my name.

GEORGE H. PHELPS.